United States Patent
Abali et al.

(10) Patent No.: US 11,914,527 B2
(45) Date of Patent: Feb. 27, 2024

(54) PROVIDING A DYNAMIC RANDOM-ACCESS MEMORY CACHE AS SECOND TYPE MEMORY PER APPLICATION PROCESS

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/452,294

(22) Filed: Oct. 26, 2021

(65) Prior Publication Data

US 2023/0131351 A1    Apr. 27, 2023

(51) Int. Cl.
G06F 12/00    (2006.01)
G06F 12/14    (2006.01)
G06F 9/30     (2018.01)
G06F 12/02    (2006.01)

(52) U.S. Cl.
CPC ...... *G06F 12/1441* (2013.01); *G06F 9/30043* (2013.01); *G06F 9/30047* (2013.01); *G06F 12/0238* (2013.01)

(58) Field of Classification Search
CPC ............. G06F 12/1441; G06F 9/30043; G06F 9/30047; G06F 12/0238
See application file for complete search history.

(56) References Cited

U.S. PATENT DOCUMENTS

| | | | |
|---|---|---|---|
| 8,631,208 B2 | 1/2014 | Fang et al. | |
| 9,478,274 B1 | 10/2016 | Michaud et al. | |
| 10,102,126 B2 | 10/2018 | Ramanujan et al. | |
| 2006/0282620 A1 | 12/2006 | Kashyap et al. | |
| 2010/0325374 A1 | 12/2010 | Cypher et al. | |
| 2014/0122824 A1* | 5/2014 | Lewsey | G06F 12/02 711/170 |
| 2015/0095582 A1 | 4/2015 | Assarpour et al. | |
| 2016/0004638 A1 | 1/2016 | Lewsey | |
| 2016/0283393 A1* | 9/2016 | Kawaba | G06F 12/0893 |
| 2017/0083444 A1* | 3/2017 | Dev | G06F 12/0871 |
| 2019/0121414 A1 | 4/2019 | Eastep et al. | |
| 2021/0240616 A1 | 8/2021 | Stabrawa et al. | |

FOREIGN PATENT DOCUMENTS

EP    2761466 B1    8/2020

OTHER PUBLICATIONS

Brasser, Franz Ferdinand Peter, "Enclave Computing Paradigm: Hardware-Assisted Security Architectures & Applications", Technische Universitat Darmstadt, 2020, (pp. 256).

\* cited by examiner

*Primary Examiner* — Arvind Talukdar
(74) *Attorney, Agent, or Firm* — Steven M. Bouknight

(57) ABSTRACT

A first type memory and a second type memory may be identified in a computing system. The second type memory is slower than the first type memory while having a greater storage capacity compared to the first type memory. An application process executing in the computing system may be identified. A region of the first type memory may be provided as a cache of the second type memory for the application process.

20 Claims, 7 Drawing Sheets

PROVIDING A DYNAMIC RANDOM-ACCESS MEMORY CACHE AS SECOND TYPE MEMORY PER APPLICATION PROCESS

BACKGROUND OF THE INVENTION

Field of the Invention

The present invention relates in general to computing systems, and more particularly to, various embodiments for providing a dynamic random-access memory (DRAM) as a cache of a second type memory per application process using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computer systems. The amount of information to be processed nowadays increases greatly. Therefore, processing, storing, and/or retrieving various amounts of information is a key problem to solve.

SUMMARY OF THE INVENTION

Various embodiments are illustrated for provided for providing of a first type memory as second type memory in a computing system by a processor. An application process executing in a computing system may be identified. A region of a first type memory may be provided as a cache of a second type memory for the application process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
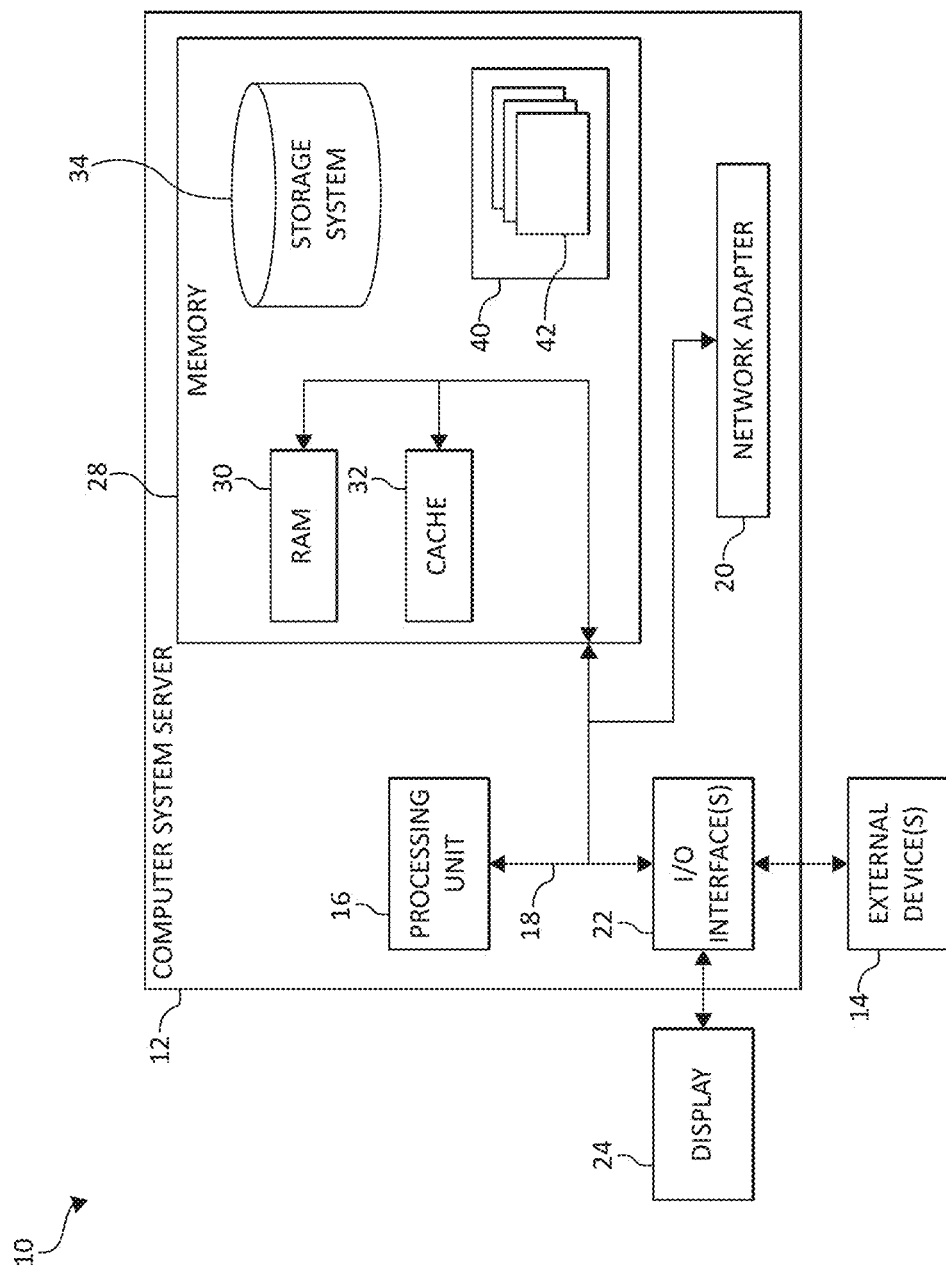
FIG. 1 is a block diagram depicting an exemplary cloud computing node according to an embodiment of the present invention.

A computing environment may include main storage (sometimes referred to as "main memory"), as well as secondary storage. Main storage is considered fast access storage compared to secondary storage such as, for example, storage class memory. Further, the addressing of main storage is considered simpler than the addressing storage class memory. Storage class memory, which is an external storage space outside of classical main storage, provides faster access and persistence than direct access storage devices. A storage class memory may be implemented as groups of solid state devices connected to a computing system via several input/output (I/O) adapters, which are used to map technology of an I/O device to the memory bus of the central processing unit(s).

Additionally, memory devices are used in a wide variety of applications, including computer systems. Computer systems and other electronic devices containing a microprocessor or similar device typically include system memory, which is generally implemented using DRAM.

Moreover, processor performance and memory performance have increased at differing rates. Increased processor performance and memory capacity increases additional virtual machines and virtualized containers. Some mechanisms for memory include slower access times, thus memory capacity for a computing system is often balanced between quick access volatile memory and slower access persistent storage. Some existing systems use storage class or persistent-memory in combination with DRAM. Some of these systems use memory buffers and memory interfaces corresponding the storage class memory and DRAM. Some systems with storage class memory and varying speeds of DRAM may use memory buffers corresponding to the varying speeds of DRAM in attempt to overcome slower speeds of some included DRAM. Some systems use local DRAM and remote DRAM communicatively connected to differing processors, sometimes referred to as "Memory-Inception".

Because these types of systems are implemented this way, it is desirable to use regions of a first memory type (e.g., a DRAM) as a cache of second type memory per application process. The second type memory may be slower, higher capacity, and/or inexpensive DRAM. The second type memory may also be some other type of memory such as, for example, non-volatile memory (NVM) Flash, phase change material (PCM), and other emerging memory. In one aspect, emerging memory has high capacity, but typically slower (latency, bandwidth) than DRAM. Accordingly, the present invention uses a region of the DRAM as a cache of second type memory per application process.

In some implementations, a first type memory and a second type memory may be identified in a computing system. The second type memory is slower than the first type memory while having a greater storage capacity compared to the first type memory. Multiple application processes executing in the computing system may be identified. The private regions of the first type memory may be provided, by the processor, as a cache of the second type memory for each of the application processes. One of the private regions in the first type memory may be dynamically enabled or disabled, by the processor, for a respective one of the plurality of application processes upon the respective one of the plurality of application processes becoming active or inactive. A size of the one of the private regions in the first type memory may be changed for the respective one of the plurality of application processes depending on one or more performance requirements for the respective one of the plurality of application processes.

In other implementations, the present invention provides a region of a first type of memory (e.g., a DRAM) configurable as a cache of the SCM (storage class memory; the 2nd type memory assuming the system DRAM and 2nd type memory are sitting on separate memory channels (e.g., Open Coherent Accelerator Processor interface "OCAPI") and/or memory buffer attaching to both the DRAM and SCM). In one aspect, the DRAM cache of SCM may perform with similar cost and capacity of 2nd type memory (e.g., 4 terabyte "TB" DRAM cache backed with 32 TB SCM (with latency and bandwidth closer to 32 TB DRAM on average)).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
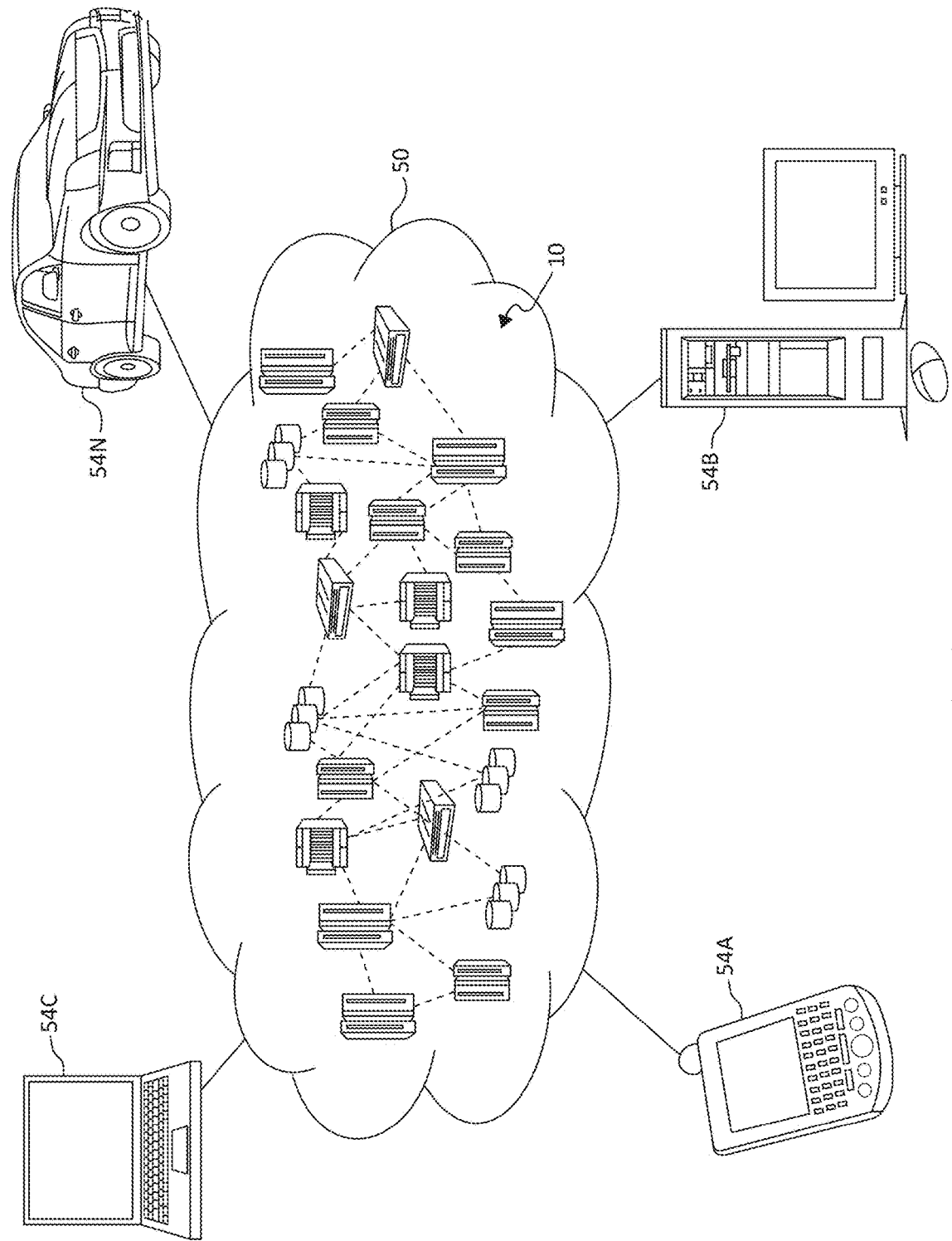
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
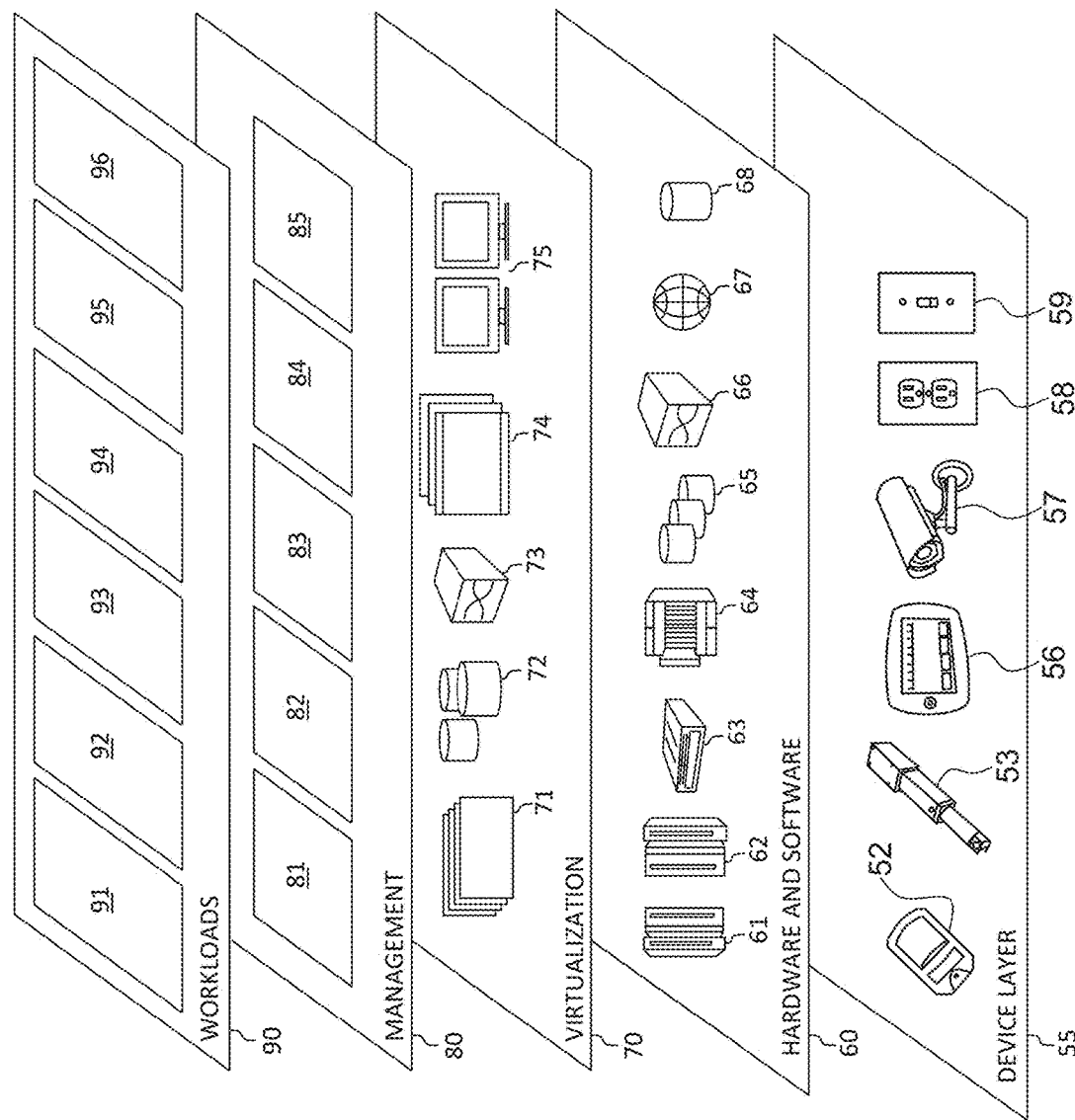
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing a regions of a first memory type as a cache of a second type memory per application process in a computing environment. In addition, workloads and functions 96 for providing a regions of a first memory type as a cache of a second type memory per application process in a computing environment may include such operations as data analysis (including data collection and processing from various environmental sensors) and/or analytics operations. One of ordinary skill in the art will appreciate that the workloads and functions 96 for providing a regions of a first memory type as a cache of a second type memory per application process in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously indicted, the present invention provides a novel solution for providing a regions of a first memory type as a cache of a second type memory per application process. In operation, an existing DRAM may be accessed and utilized. A region of a first memory type may be configured as a cache per software process. A set of address ranges stored in the cache controller defines a region in a local first memory type (e.g., a local DRAM or "fast memory" or "lower latency" memory) as a cache per process. In an additional implementation, another set of address ranges, stored in the cache controller, defines a region in the second type memory (e.g., the slow memory or higher latency memory) as a second type region for each process.

In operation, upon an application process (e.g., a software process) becoming active, an operating system ("OS") enables the application process to execute/run on a processor core. Additionally, the OS may load each of the address ranges for the process to the cache controller. Accordingly, the size of the cache of the defined region in the first memory type and the second type memory region are per software process specific and may be adjusted by depending on performance of the application based on the cache region (e.g., increase or decrease based performance and/or benefit derived from caching).

As such, the cache in the first type memory and the second type memory for each individual process becomes active for the duration of that activity (e.g., while the application process is active). When the active application process becomes inactive, its respective cache region addresses in the first type memory are erased from the cache controller. However, cache contents of the process may remain intact in the first type memory provided the first type memory capacity is sufficient. When two or more application processes are active, their respective cache regions are private for each process and cannot be replaced by other active processes region contents.

In some implementations, a first type memory and a second type memory may be identified in a computing system. The second type memory is slower than the first type memory while having a greater storage capacity compared to the first type memory. Multiple application processes executing in the computing system may be identified. The private regions of the first type memory may be provided, by the processor, as a cache of the second type memory for each of the application processes. One of the private regions in the first type memory may be dynamically enabled or disabled, by the processor, for a respective one of the plurality of application processes upon the respective one of the plurality of application processes becoming active or inactive. A size of the one of the private regions in the first type memory may be changed for the respective one of the plurality of application processes depending on one or more performance requirements for the respective one of the plurality of application processes.

Figure 4:
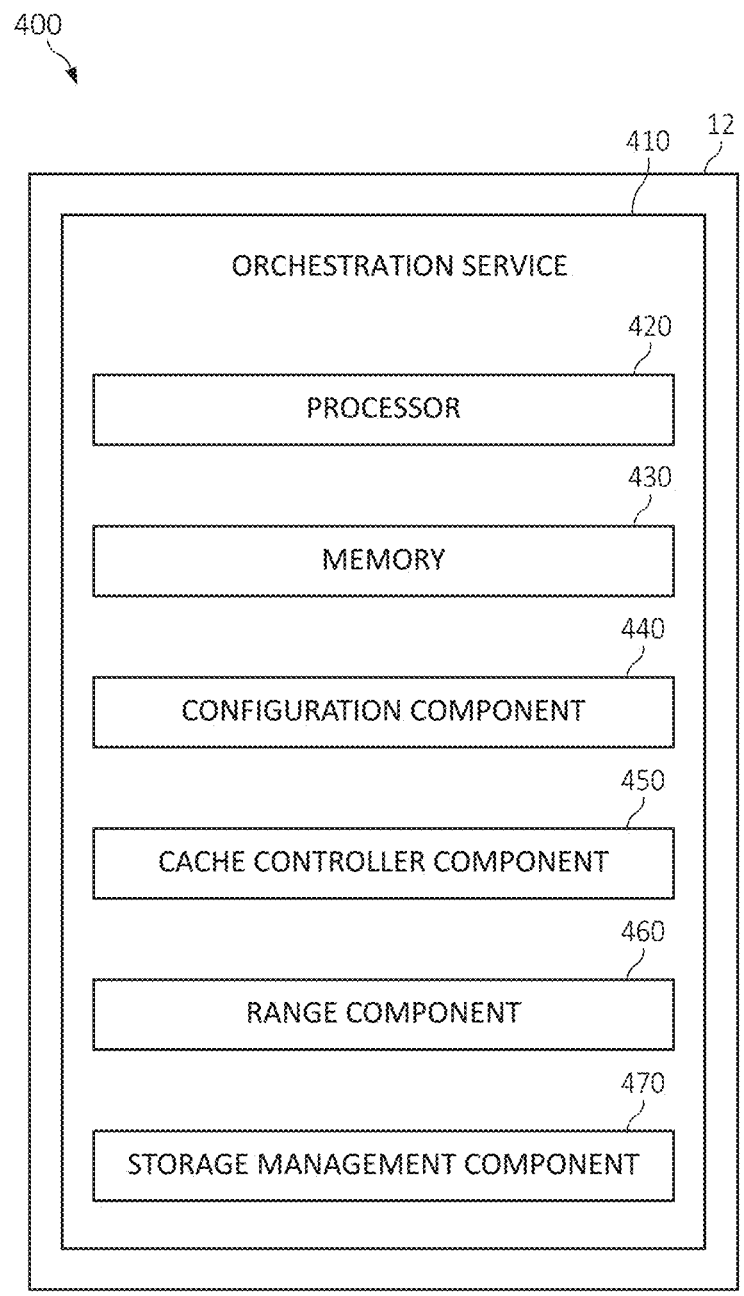
FIG. 4 is an additional block diagram depicting an exemplary functional relationship between various aspects of the present invention.

Turning now to FIG. 4, is a block diagram depicting exemplary functional components of system 400 for providing a region of a first memory type as a cache of a second type memory per application process in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

As one of ordinary skill in the art will appreciate, the depiction of the various functional units in the system 400 is for purposes of illustration, as the functional units may be located within or external to the computer system/server 12 of FIG. 1 or elsewhere within and/or between distributed computing components.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

An orchestration service 410 (e.g., dynamic scheduling agent) is shown, incorporating processing unit 420 ("processor") to perform various computational, data processing and other functionality in accordance with various aspects of the present invention. In one aspect, the processor 420 and memory 430 may be internal and/or external to the orchestration service 410, and internal and/or external to the computing system/server 12. The orchestration service 410 may be included and/or external to the computer system/server 12, as described in FIG. 1. The processing unit 420 may be in communication with the memory 430. The orchestration service 410 may include a configuration component 440, a cache controller component 450, and a range component 460.

In some implementations, the orchestration service 410 may, using the configuration component 440, the cache controller component 450, the range component 460, and the storage management component 470 may identify an application process is executing in a computing system and provide a region of a first type memory as a cache of a second type memory for the application process.

In other implementations, the orchestration service 410 may, using the configuration component 440, the cache controller component 450, the range component 460, and the storage management component 470 may identify a first type memory and a second type memory may be identified in a computing system. The orchestration service 410 may, using the configuration component 440, the cache controller component 450, the range component 460, and the storage management component 470 may identify a plurality of application processes executing in the computing system; provide, by the processor, private regions of the first type memory as a cache of the second type memory for each of the plurality of application processes; dynamically enable or disable, by the processor, one of the private regions in the first type memory for a respective one of the plurality of application processes upon the respective one of the plurality of application processes becoming active or inactive; and dynamically change a size of the one of the private regions in the first type memory for the respective one of the plurality of application processes depending on one or more performance requirements for the respective one of the plurality of application processes.

The configuration component 440 may define a first set of address ranges stored in a range of registers in a cache controller to serve as the private region of the first type memory per application process. The configuration component 440 may define a second set of address ranges stored in a range of registers in a cache controller to serve as a secondary private region of a second type memory for the application process.

The configuration component 440, in association with the cache controller 450 and the range component 460 and, may provide access to the private region of the first type memory for the application process where the private region is configured as the cache of the second type memory. The configuration component 440, in association with the cache controller 450 and the range component 460 and, may provide access to a secondary private region in a second type memory for the application process where the secondary private region is an additional cache in the second type memory for the application process.

The cache controller 450 may coordinate access to the private region of the first type memory and the secondary private region in the second type memory for the application process by a cache controller.

The cache controller 450, which may optionally employ the configuration component 440, may adjust a size of the private region of the first type memory based on performance of the application process using the private region, wherein the size is increased or decreased.

The cache controller component 450 may identify the application process is active where an active application process uses the first type memory and the second type memory. The cache controller component 450 may load and store a first set of address ranges of the range stored in a cache controller to serve as the private region of the first type memory for the active application process where alternative address ranges of alternative ranges for each inactive application process is removed from the cache controller.

In one aspect, providing the private region of the first type memory as a cache of the second type memory per application process includes identifying a cache line with a cache address in the first type memory (e.g., a local DRAM). The cache line is compressed within the first type memory to generate a compressed cache line and an open memory space within the cache line. A cache tag is generated in the open memory space and a validation value is generated in the open memory space for the compressed cache line. A cache-hit may be determined for the cache line based on a cache address, the cache tag, and a validation value.

In some implementations, the cache line has a cache address in the first type memory. The DRAM cache or local DRAM may be a first memory type associated with or accessible to one or more processors of a computing system. In some embodiments, the local DRAM is a cache of nonuniform memory access (NUMA) DRAM, storage class memory (SCM), or a set of DRAM having variable speeds. The NUMA DRAM, SCM, variable speed DRAM, a backing storage, and secondary storage may be a second memory type associated with or accessible to the one or more processors of a computing system. In some embodiments, the DRAM cache is a one terabyte or greater cache. Backing storage, secondary storage, or other memory component may be sixty four terabytes or more. In some instances, local address space of one or more processors of a computer system are divided into a first region and a second region. The first memory type (e.g., the DRAM cache) may be mapped to the first region. The second memory type (e.g., the SCM or backing storage) may be mapped to the second region. The cache line may be compressed within the first type memory. Compressing the cache line generates a compressed cache line.

In some aspect, the compression may be a light compression. The light compression may compress address information and cache line data of a cache line together within the local DRAM. In some embodiments, compression of the cache line generated an open memory space within the local DRAM. Light compression of the cache line may create the open memory space as a one byte open space. In such instances the cache line may initially be a 128-byte cache line and be lightly compressed to be a 127-byte compressed cache line. In some embodiments, the open memory space is contiguous with the compressed cache line within the local DRAM. The compressed cache line or encoded cache line may pass transparently through the processor nest or other memory architecture which simplifies implementation of the present disclosure. In some embodiments, the cache line is a set of cache lines. The set of cache lines may be stored within the first type memory. In such instances, in order to compress the set of cache lines, a compressibility of each cache line of the set of cache lines may be determined. The compression component may determine a first subset of cache lines of the set of cache lines is compressible. In such instances, the compression component 120 compresses each line of the first subset of cache lines within the local DRAM (e.g., the first region of the local address space of a processor). By compressing each cache line of the first subset of cache lines, a set of compressed cache lines and a set of open memory spaces may be generated.

In some implementations, a second subset of cache lines of the set of cache lines is uncompressible. In such instances, an indication of the second subset of cache lines may be passed to cache controller component 450 and store the second subset of cache lines in a backing memory, the backing memory being one of remote DRAM, or an SCM, or Memory-Inception. A cache tag may be generated in the open memory space for the compressed cache line. The tag may be a one-byte tag, or a tag configured to be stored in a one byte space freed through compression of the cache line. Although stated with respect to a specified size or amount of space, it should be understood that the tag may be any suitable size sufficient to be stored in the open memory space. In some instances, the tag is a cache tag of log 2 (SCMsize/DRAMsize) bits. In such instances the logarithm is in a base of 2. For example, for a one terabyte DRAM and a sixty-four terabyte SCM, the tag will be six bits since log 2(64) is six bits. In embodiments where the compressed cache line is one of the set of compressed cache lines, a distinct cache tag may be generated for each compressed cache line of the set of compressed cache lines. In some embodiments, metadata may be generated and stored next to the cache tag, in the same open space created by compression. The metadata may include a physical address of the cache line at a remote memory. The metadata may also include security keys, replacement information, prefetch status, combinations thereof, or any other information enabling retrieval of data relating to the cache line.

A validation value may be generated in the open memory space for the compressed cache line. The validation value may be a single bit. In some embodiments, the validation value indicates whether the cache line is held within the DRAM cache or within the SCM or backing memory. In embodiments where validation values are generated for the set of compressed cache lines, validation value may be generated for each compressed cache line of the set of compressed cache lines. In some embodiments, the validation value generated for each compressed cache line of the set of compressed cache lines (e.g., the first subset of cache lines) may be a first validation value. The first validation value may indicate presence of the compressed cache line and a cache tag within the local DRAM. In such instances, the validation value may be generated as a one, a constant value, or any other suitable value.

In embodiments where the second subset of cache lines have been determined to be uncompressible and therefore stored in the backing memory, a second validation value may be generated for each cache line of the second subset of cache lines. In some instances, while the uncompressible second subset of cache lines are stored in the second region of local address space, a validation value, indicating the cache line is invalid may be stored in the first region to indicate that the respective cache line is stored in the second region. The second validation value may be stored in the local DRAM. The second validation value may be generated as a zero, a constant value distinct from the first validation value, or any other suitable value. Validation of value of zero indicates that the local DRAM does not contain a cache line and that the line is stored in the backing memory.

In some embodiments, where the second subset of cache lines have been determined to be uncompressible and stored in the backing memory (e.g., the second region of local address space of a processor), a fixed tag bit-pattern or a fixed data pattern may be generated within the first type memory. A direct mapped cache may be generated. The cache size may be increased to an extent of capacity of the first type memory. In some instances, the cache size may be increased to the extent of first type memory capacity to overcome lack of associativity within the first type memory cache.

In some embodiments, the cache may be known by an address originator and a cache controller/decoder south of L2. The cache controller component 450 may identify, access, and retrieve cache lines and respond to a cache request. The cache request may be a cache read or a cache write. The cache read operation may determine a presence of a cache or cache line. Determining the presence of the cache or cache line may determine whether a cache-hit or a cache-miss occurs for the cache line. The cache write may compress the cache line and store the tag and validation value within free space created by compressing the cache line. When the sector cannot be compressed, the cache write operation may generate the validation value of zero in the free or open space and write the cache line to next level memory instead of the DRAM cache.

In some embodiments, the cache controller component 450 determines a cache-hit for the cache line. The cache-hit may be determined based on the cache address, the cache tag, and the validation value. The cache controller component 450 may retrieve the cache line from the first type memory when a cache-hit is determined.

In some embodiments, the cache controller component 450 determines a cache-miss for the cache line. In such instances, the cache line may be stored in the backing memory based on the cache line being uncompressible. The cache controller component 450 may determine the cache-miss based on the second validation value being set at zero within the local DRAM, indicating the cache line has been stored in the backing memory and is not present within the first type memory.

In some embodiments, the cache controller component 450 determines the cache-miss for the cache line based on a fixed tag bit-pattern or a fixed data pattern. When the pattern is present, the cache contents may be considered invalid and cause the cache controller component 450 to return a cache-miss. When a cache-miss occurs, the cache controller component 450 uses Memory-Inception, passing instructions through one or more processors to retrieve the cache line from a non-local DRAM, a SCM, a backing memory, or other memory component or module other than the local DRAM. In some embodiments, the cache controller component 450 accesses the SCM, backing memory, slow DRAM, or other memory component or module to retrieve the cache line which was subject to the cache-miss in first type memory. In such instances, the cache controller component 450 accesses the memory component or module directly through one or more processors communicatively coupled to the first type memory.

The cache controller component 450 may perform the above-referenced operations without a directory. Similarly, the operations of the system 400 may be performed without on-chip or off-chip arrays. The cache controller component 450 may be a simple and hardware efficient cache controller. The cache controller component 450 may use part of local DRAM as a cache of SCM and inception clustered memory.

In some embodiments, where remote memory, SCM, or backing memory are noncontiguous or page-based, remote addresses of data may be mapped to cache addresses within the local DRAM cache. In such instances, the DRAM cache controller may access the DRAM cache, while other functions may be precluded from doing so. For example, where a set of data is mapped from remote memory to a portion of local DRAM at address CSSSSSS, the 0SSSSSS may be SCM backing storage mapped into a thread of page table entry (PTE) from the remote address and 1000000 is within the DRAM cache. The information in the DRAM cache may not be mapped into the thread of PTE remote address. The processor cache coherence logic may operate on 0SSSSSS forms of addresses while 1000000 addresses are not cached. Reads and pushes to 1000000 may be directed to remote memory. In some instances, the DRAM cache may have cache lines installed from a function or component from L3 cache write. The DRAM cache and backing storage may both be updated with the cache line. In return the DRAM cache controller, cooperating with one or more components of the caching system, compresses the cache line and pushes to an address (e.g., 1000000) with a cache tag (e.g., Tag=SSSSSS). The raw cache line may be pushed to an address in backing P202100205US01 Page 10 of 30 storage at an address (e.g., 0SSSSSS). Where the line originally came from the DRAM cache, the cache line may be compressed and pushed to an address with a cache tag with a bit not set by the L3 cache write. The bit may be architected in L2 and set to one if the line came from the DRAM cache. If the line did not originate in the DRAM cache, the bit may be reset to zero. Where conflicting cache writes occur, a last cache write may win or overwrite the previous cache write.

In some examples, the cache controller component 450 (which may function as a retrieval component) responds to a cache read request by attempting to read cache lines. If the cache controller component 450 finds a cache-miss, the cache controller component 450 may issue a read to 0SSSSSS, the backing storage. If clean and with no intervention, cache controller component 450 may substitute 1000000 in the remote address and read the cache line from the DRAM cache. The cache controller component 450 may launch the cache read from the DRAM cache early to reduce latency. Where an intervention or cache miss occurs while attempting to read from the DRAM cache, the data may be discarded. The cache controller component 450 may examine the tag in a returned cache line upon a read from the DRAM cache. Where the tag is an appropriate cache tag and the validation value is deemed valid, the cache controller component 450 determines a cache-hit and decompresses the cache line. The cache line may then be forwarded to a load-store unit (LSU) of the processor and placed into L2 cache. When the cache tag or validation value are not deemed valid, the cache controller component 450 determines a cache-miss. The cache controller component 450 may read the cache line from the SCM or backing memory.

Figure 5:
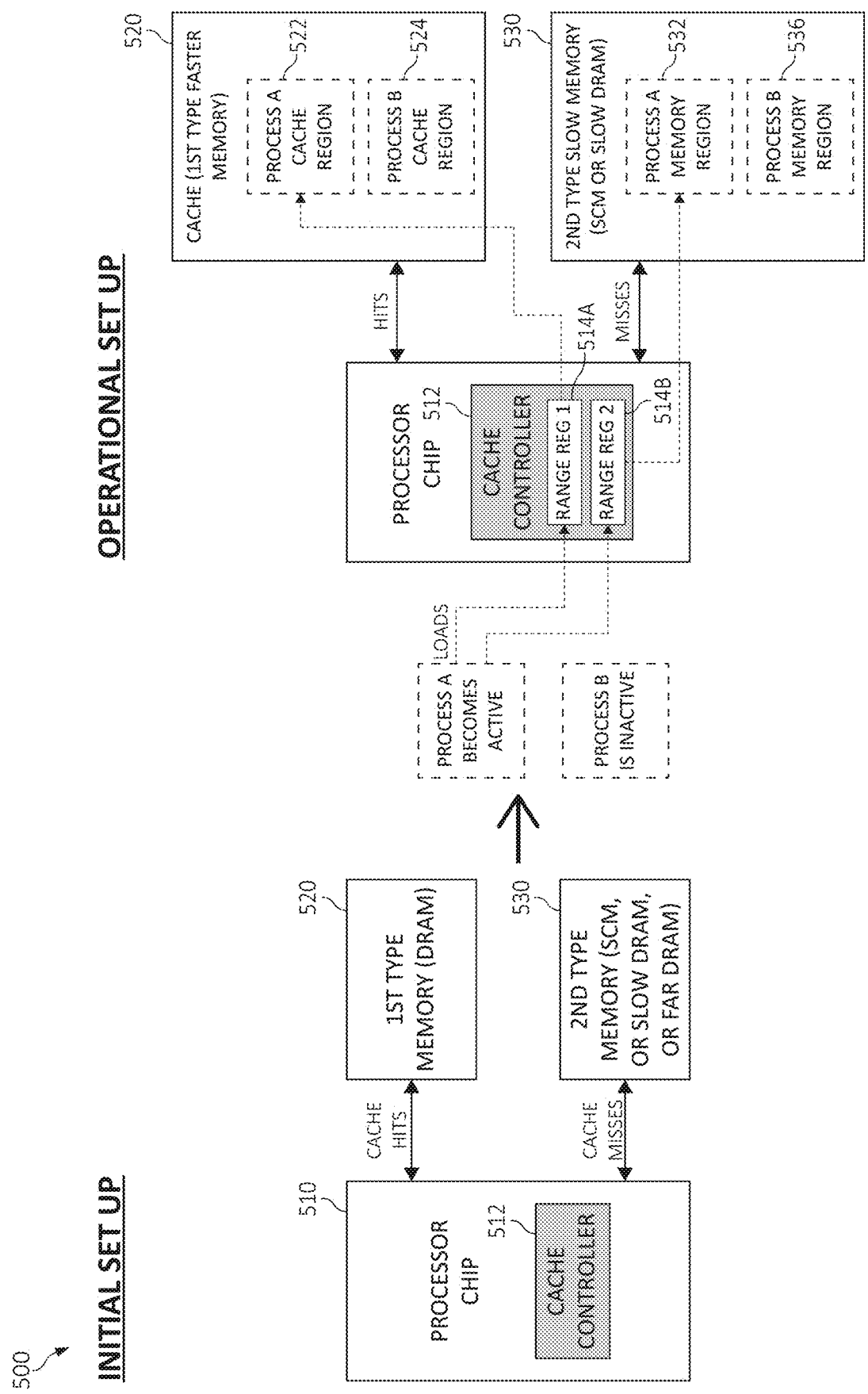
FIG. 5 is an additional block diagram depicting operations of providing a DRAM as a cache of a second type memory per application process, in which aspects of the present invention may be realized.

For further explanation, FIG. 5 is an additional block diagram depicting operations of providing a dynamic random-access memory ("DRAM") as a cache of a second type memory per application process in which aspects of the present invention may be realized. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

As depicted, a processor 510 (e.g., a processor device/chip) may include a cache controller 512. The processor 510 is in communication with a first memory type 520 (e.g., a DRAM) and a second memory type 530. The second memory type 530 may be a slow DRAM, a SCM, a NVM Flash, PCM, and other emerging memory. In one aspect, the second memory type has a higher capacity, but is slower (latency, bandwidth) than the first memory type 520 (e.g., DRAM). A majority of the data will be stored in the second memory type 530. In one aspect, the cache hits will go to the first memory type 520 while the cache misses will go to the second memory type 530.

The processor 510 may also include a cache controller 512 having one or more range registers such as, for example, range registers 514A, 514B. The first memory type 520 may include one or more regions in the first type memory 520 that is configured a cache of the second type memory for the application process such as, for example region 522 for application process A and region 524 for process B. That is, the region 522 is a first set of address ranges stored in a range of registers such as, for example, range register 514A (e.g., range register 1) in the cache controller 512 to serve as the region 522 of the first type memory 520 for the application process A. Also, region 524 is another set of address ranges stored in a range of registers such as, for example, range register 514A (e.g., range register 1) in the cache controller 512 to serve as the region 524 of the first type memory 520 for the application process B. Thus, each "range" in the first type memory 520 that is configured a cache of the second type memory is per application process.

The cache controller 512 may also include one or more alternative sets of address ranges stored in the range of registers such as, for example, range register 514B (e.g., range register 2) to serve as a memory region (e.g., region 532 for application process A and region 536 for application process B) of the second type memory 530 for the application process such as, for example, application process A and application process B.

In operation, consider the following operations. Assume application process A becomes active. Upon activation application process A, region 522 is defined and configured for application process A. The region 522 is a first set of address ranges stored in a range of registers such as, for example, range register 514A (e.g., range register 1) in the cache controller 512 to serve as the region 522 of the first type memory 520 for the application process. The location (e.g., the set of address ranges) of the region 522 in the first type memory 520 is stored in the cache controller 512.

The cache controller 512 may also allocate the second type memory 530 for the application process such as, for example, application process A. The allocation may include storing location (e.g., the set of address ranges) of the second type memory 530 in the cache controller 512 such as, for example, the range register 514B (e.g., range register 2) to serve as a memory region (e.g., region 532 for application process A).

During execution, the application process A may perform load and store data operations, which will be primarily loaded and store data in the region 522 of the first type memory 520. However, if a cache miss occurs for the region 522 of the first type memory 520, the cache controller 512, using the range register 514B (e.g., range register 2) to serve as a memory region (e.g., region 532 for application process A), will indicate the data is stored in the second type memory 530. The cache controller 512 enables the application process A to perform the load or store of data from the allocated region for application process A such as, for example, memory region 532.

It should be noted that while application process A is active, application B is inactive. Thus, the cache controller 512 may remove the address ranges of memory range 524 for the inactive application process B from the cache controller 512, but the address ranges of memory range 536 is the preserved in the second type memory 530. Upon application process B becoming active, the address ranges of memory range 524 may be reloaded and stored in the cache controller 512.

Figure 6:
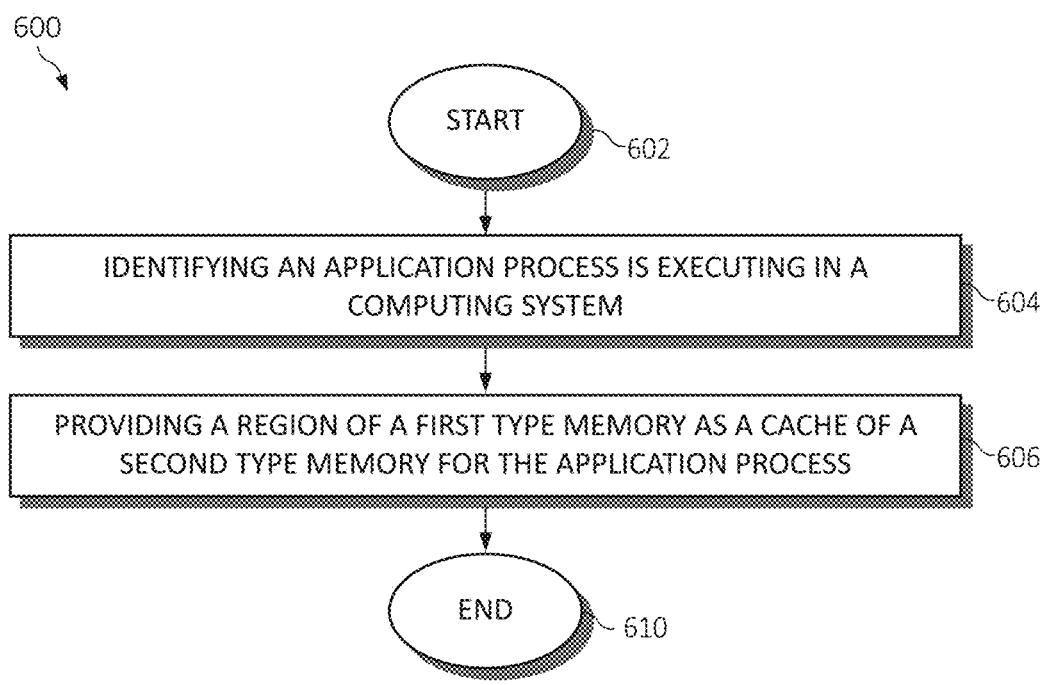
FIG. 6 is a flowchart diagram depicting an exemplary method for providing a region of a first memory type as a cache of a second type memory per application process, in accordance with aspects of the present invention.

Turning now to FIG. 6, a method 600 for providing a portion of a first type memory to function as a cache of a second type memory in a computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

An application process identified as executing in a computing system, as in block 604. For example, an application process commences executing on a processor core. Such activity may trigger the processor core to signal a cache controller indicating the application process is active. A region of a first type memory may be provided as a cache of a second type memory for the application process, as in block 606. The region may be configured to function as a cache similar to a cache of a second type memory. The functionality 600 may end in block 610.

In one aspect, in conjunction with and/or as part of at least one block of FIG. 6, the operation of method 600 may include each of the following. The operation of functionality 600 may define a first set of address ranges stored in a range of registers in a cache controller to serve as the private region of the first type memory per application process. The operation of functionality 600 may define a second set of address ranges stored in a range of registers in a cache controller to serve as a secondary private region of a second type memory for the application process.

The operation of functionality 600 may provide access to the private region of the first type memory for the application process where the private region is configured as the cache of the second type memory. The operation of functionality 600 may provide access to a secondary private region in a second type memory for the application process where the secondary private region is an additional cache in the second type memory for the application process.

The operation of functionality 600 may coordinate access to the private region of the first type memory and the secondary private region in the second type memory for the application process by a cache controller. The operation of functionality 600 may adjust a size of the private region of the first type memory based on performance of the application process using the private region, wherein the size is increased or decreased. The operation of functionality 600 may identify the application process is active where an active application process uses the first type memory and the second type memory. The operation of functionality 600 may load and store a first set of address ranges of the range stored in a cache controller to serve as the private region of the first type memory for the active application process where alternative address ranges of alternative ranges for each inactive application process is removed from the cache controller and preserved in the first type memory.

The operation of functionality 600, for providing a region of the first type memory as the cache of a second type memory (e.g., the private regions in the first type memory performs/functions as a second type memory cache) per application process, may segment a cache line into a set of quadword sectors. In some embodiments, the cache line is a 128-byte cache line. The operation of functionality 600 may treat the cache line as four 32-byte quadword sized sectors and segment the cache line to reflect the quadword sized sectors. In some instances, operations of functionality 600 segment the cache line into octword sectors using a processor bus unit of data transfer. The octword sectors may include a critical octword.

The operation of functionality 600, for providing a region of the first type memory as the cache of a second type memory per application process, may position the set of quadword or octword sectors sequentially or contiguously in the first memory type. In some instances, the cache line, quadword sectors, or octword sectors may be mapped into the first memory type cache from contiguous or non-contiguous positions in a second memory type (e.g., a remote memory, SCM, or backing memory). The second memory type addresses may be mapped to the cache address using any suitable operation. For example, the second memory type addresses may be mapped to the cache address as represented by: CacheAddr=RemoteAddr modulo CacheSize.

Such instances may use a simple algebraic operation to map addresses in a manner similar to direct mapped cache arithmetic. Where the cache line, quadword, or octwords are non-contiguous or page-based, mapping tables may be used that translate linear or contiguous cache addresses to an actual cache address.

The operation of functionality 600, for providing a region of the first type memory as the cache of a second type memory per application process, may compresses each quadword sector of the set of quadword sectors. Compression of the set of quadword sectors generates a set of compressed quadword sectors. In some embodiments, the operation of functionality 600, for providing a region of the first type memory as the cache of a second type memory per application process, may lightly or trivially compresses each quadword sector of a cache line to make open or free space available. For example, each quadword sector may be compressed sufficiently to create open space of six bits. The operation of functionality 600, for providing a region of the first type memory as the cache of a second type memory per application process, may compress each quadword sector as described above.

The operation of functionality 600, for providing a region of the first type memory as the cache of a second type memory per application process, may similarly compress each octword sector, where the cache line is segmented into octwords. The operation of functionality 600, for providing a region of the first type memory as the cache of a second type memory per application process, may generates a cache tag for each compressed quadword of the set of compressed quadword sectors. The cache tag may be a K-bit cache address tag. The operation of functionality 600, for providing a region of the first type memory as the cache of a second type memory per application process, may generate a validation value for each compressed quadword sector of the set of compressed quadword sectors. Where a validation value is to be generated, the cache tag may be a K-bit cache address tag plus a valid bit. For example, the cache tag may be generated as a six bit tag with a validation bit.

The operation of functionality 600, for providing a region of the first type memory as the cache of a second type memory per application process, may similarly generate cache tags and validation values for each octword, where the cache line is segmented into octword sectors. The operation of functionality 600, for providing a region of the first type memory as the cache of a second type memory per application process, may generate the cache tag and the validation value for each compressed quadword in a manner similar to or the same as described above. The operation of functionality 600, for providing a region of the first type memory as the cache of a second type memory per application process, may execute a cache write operation. The cache write operation may compress each sector and write the tag and validation value in the free or open space created by compressing the respective quadword sectors. Where one or more sectors cannot be compressed, the cache write operation writes a validation value of zero in the free or open space and writes the sectors of the cache line to the next level memory, such as the SCM, instead of the DRAM cache.

The operation of functionality 600, for providing a region of the first type memory as the cache of a second type memory per application process, may respond to a cache request based on the set of compressed quadword sectors. In some embodiments, the set of compressed quadwords includes a critical quadword. The operation of functionality 600, for providing a region of the first type memory as the cache of a second type memory per application process, may respond to the cache request by determining a cache-hit or cache-miss based on the critical quadword of the set of compressed quadword sectors. The cache-hit may occur where an address and a tag are matched for a quadword, such as the critical quadword. Further, the cache-hit may occur where the address and the tag are matched, and where the status is determined to be valid, based on the validation value. Where the address and tag are not matched, or the quadword is determined not to be valid, the cache-miss occurs. Where the cache-miss occurs, the cache line may be read from next level memory, such as SCM.

The operation of functionality 600, for providing a region of the first type memory as the cache of a second type memory per application process, may similarly respond to a cache request based on a critical octword. In some instances, octword sectors of a cache line may be arbitrarily recorded within the DRAM cache.

The operation of functionality 600, for providing a region of the first type memory as the cache of a second type memory per application process, may perform a cache read operation on the critical quadword first. The critical quadword is read from the first memory type cache. If the validation value (e.g., the valid bit) equals one or is otherwise determined to be valid and the tag matches, the critical quadword is decompressed and delivered to a cache controller.

The operation of functionality 600, for providing a region of the first type memory as the cache of a second type memory per application process, may decompress the critical quadword. The remaining quadwords in the cache line may then be subsequently or sequentially decompressed and each decompressed quadword may be retrieved.

The operation of functionality 600, for providing a region of the first type memory as the cache of a second type memory per application process, may be performed in a manner similar to or the same as described above. The operation of functionality 600, for providing a region of the first type memory as the cache of a second type memory per application process, may, identify, create, assign, or generate an address for the first region from an address of the second region for each quadword sector. In response to a cache hit, the cache line may be read from the first region by decompressing a quadword sector of the set of quadword sectors associated with the cache hit and the quadword sector may be delivered to one or more processors. In some instances, an address is generated for the first region from an address of the second region. In response to a cache miss, the cache line may be read from the second region. The first region may be a local address space of a processor mapped to a DRAM cache and the second region may be a local address space of a processor mapped to a secondary memory, such as SCM or backing memory.

Figure 7:
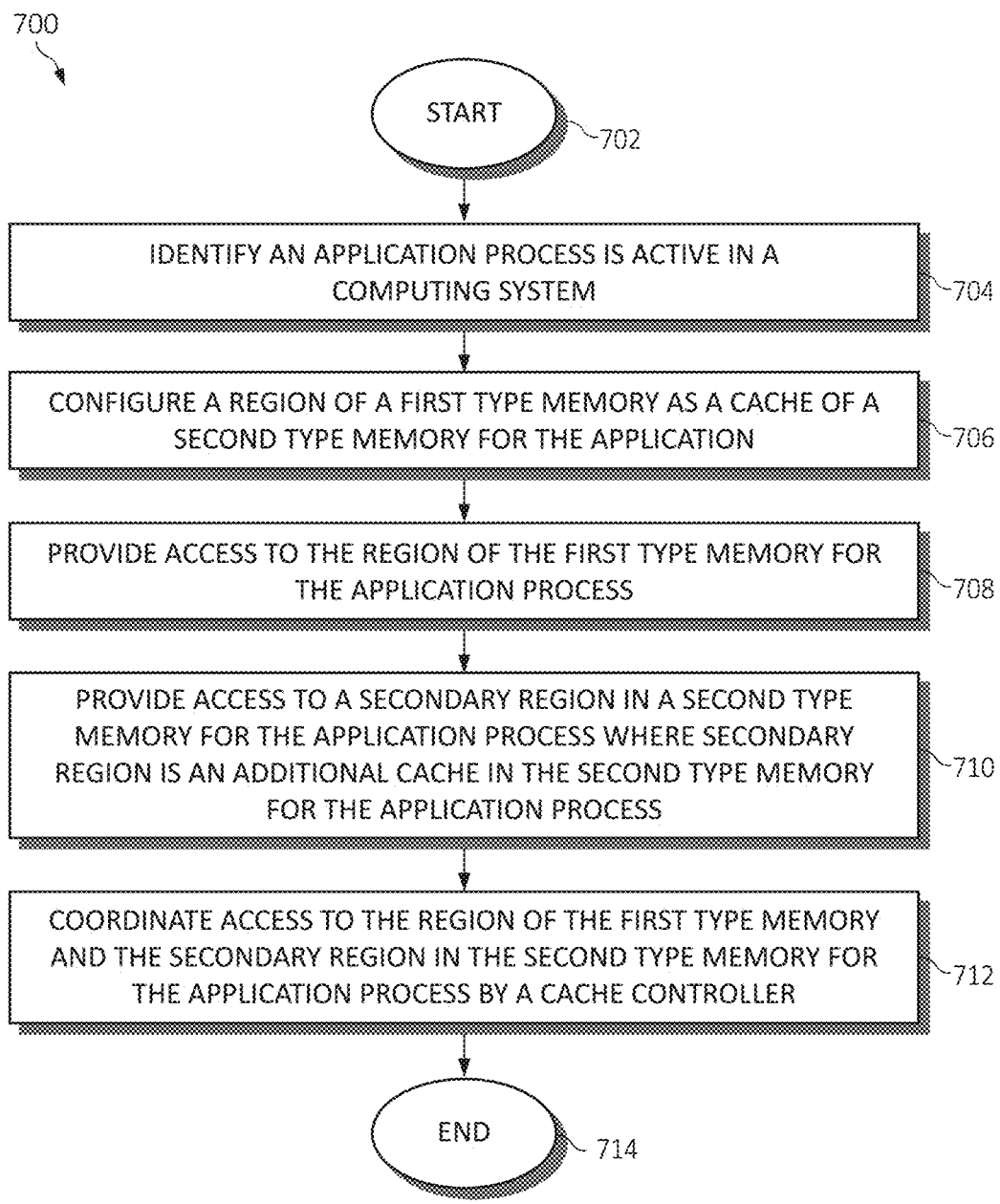
FIG. 7 is a flowchart diagram depicting an exemplary method for providing a regions of a DRAM for use as a cache of a second type memory per application process in a computing system, in which aspects of the present invention may be realized.

Turning now to FIG. 7, a method 700 for region of a first type memory as a cache of a second type memory in a computing environment is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

An application process may be identified as active in a computing system, as in block 704. A region of a first type memory may be provided as a cache of a second type memory for the application process, as in block 706. Access to the private region of the first type memory may be provided for the application process, as in block 708. Access to a secondary private region in a second type memory for the application process where secondary private region is an additional cache in the second type memory for the application process, as in block 710. Access to the private region of the first type memory and the secondary private region in the second type memory may be coordinated for the application process by a cache controller, as in block 712. The functionality 700 may end in block 714.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, in a computing environment, comprising:
   identifying a first type memory and a second type memory in a computing system, wherein the second type memory is slower than the first type memory while having a greater storage capacity compared to the first type memory;
   identifying a plurality of application processes executing in the computing system;
   providing, by the processor, private regions of the first type memory as a cache of the second type memory for each of the plurality of application processes;
   dynamically enabling or disabling, by the processor, one of the private regions in the first type memory for one of the plurality of application processes becoming active or inactive, wherein, responsive to a respective one of the plurality of application processes previously being active and becoming inactive, cache region addresses in the first type of memory associated with the respective one of the plurality of application processes are erased from a cache controller while preserving cache region addresses in the second type memory associated with the respective one of the plurality of application processes, and wherein, upon the respective one of the plurality of application processes becoming active again after becoming inactive, the cache region addresses in the first type of memory are reloaded and stored in the cache controller; and dynamically changing a size of the one of the private regions in the first type memory for the one of the plurality of application processes based on performance requirements for the one of the plurality of application processes.

2. The method of claim 1, further including defining a first set of address ranges stored in a range of registers in the cache controller to serve as a private region of the first type memory for each one of the plurality of application processes.

3. The method of claim 1, further including defining a second set of address ranges stored in a range of registers in the cache controller to serve as secondary private region of the second type memory for each one of the plurality of application processes.

4. The method of claim 1, further including:
providing access to the private regions of the first type memory for each one of the plurality of application processes, wherein the private regions are configured as the cache of the second type memory; and
providing access to secondary private regions in the second type memory for each one of the plurality of application processes, wherein the secondary private regions are an additional cache in the second type memory for each one of the plurality of application processes.

5. The method of claim 4, further including coordinating access to the private regions of the first type memory and the secondary private region in the second type memory for each one of the plurality of application processes by the cache controller.

6. The method of claim 1, further including adjusting a size of the private regions of the first type memory based on performance of for each one of the plurality of application processes using the private regions, wherein the size is increased or decreased.

7. The method of claim 1, further including:
identifying one or more of the plurality of application processes are active, wherein the one or more of the plurality of application processes use the first type memory and the second type memory; and
loading and storing a first set of address ranges of the range stored in the cache controller to serve as a private region of the first type memory for an application process, wherein alternative address ranges of alternative ranges for each inactive application process is removed from the cache controller.

8. A system for increasing computing efficiency in a computing environment, comprising:
one or more computers with executable instructions that when executed cause the system to:
identify a first type memory and a second type memory in a computing system, wherein the second type memory is slower than the first type memory while having a greater storage capacity compared to the first type memory;
identify a plurality of application processes executing in the computing system;
provide, by the processor, private regions of the first type memory as a cache of the second type memory for each of the plurality of application processes;
dynamically enable or disable, by the processor, one of the private regions in the first type memory for a respective one of the plurality of application processes upon the respective one of the plurality of application processes becoming active or inactive, wherein, responsive to a respective one of the plurality of application processes previously being active and becoming inactive, cache region addresses in the first type of memory associated with the respective one of the plurality of application processes are erased from a cache controller while preserving cache region addresses in the second type memory associated with the respective one of the plurality of application processes, and wherein, upon the respective one of the plurality of application processes active again after becoming inactive, the cache region addresses in the first type of memory are reloaded and stored in the cache controller; and
dynamically change a size of the one of the private regions in the first type memory for the respective one of the plurality of application processes depending on one or more performance requirements for the respective one of the plurality of application processes.

9. The system of claim 8, wherein the executable instructions when executed cause the system to define a first set of address ranges stored in a range of registers in the cache controller to serve as a private region of the first type memory for each one of the plurality of application processes.

10. The system of claim 8, wherein the executable instructions define a second set of address ranges stored in a range of registers in the cache controller to serve as secondary private region of the second type memory for each one of the plurality of application processes.

11. The system of claim 8, wherein the executable instructions when executed cause the system to:
provide access to the private regions of the first type memory for each one of the plurality of application processes, wherein the private regions are configured as the cache of the second type memory; and
provide access to secondary private regions in the second type memory for each one of the plurality of application processes, wherein the secondary private regions are an additional cache in the second type memory for each one of the plurality of application processes.

12. The system of claim 8, wherein the executable instructions when executed cause the system to coordinate access to the private regions of the first type memory and the secondary private region in the second type memory for each one of the plurality of application processes by the cache controller.

13. The system of claim 8, wherein the executable instructions when executed cause the system to adjust a size of the private regions of the first type memory based on performance of for each one of the plurality of application processes using the private regions, wherein the size is increased or decreased.

14. The system of claim 8, wherein the executable instructions when executed cause the system to:
identify one or more of the plurality of application processes are active, wherein the one or more of the plurality of application processes use the first type memory and the second type memory; and
load and store a first set of address ranges of the range stored in the cache controller to serve as a private region of the first type memory for an application process, wherein alternative address ranges of alternative ranges for each inactive application process is removed from the cache controller.

15. A computer program product for increasing computing efficiency in a computing environment, the computer program product comprising:
- one or more non-transitory computer readable storage devices, and program instructions collectively stored on the one or more non-transitory computer readable storage devices, the program instructions comprising:
- program instructions to identify a first type memory and a second type memory in a computing system, wherein the second type memory is slower than the first type memory while having a greater storage capacity compared to the first type memory;
- program instructions to identify a plurality of application processes executing in the computing system;
- program instructions to provide, by the processor, private regions of the first type memory as a cache of the second type memory for each of the plurality of application processes;
- program instructions to dynamically enable or disable, by the processor, one of the private regions in the first type memory for a respective one of the plurality of application processes upon the respective one of the plurality of application processes becoming active or inactive, wherein, responsive to a respective one of the plurality of application processes previously being active and becoming inactive, cache region addresses in the first type of memory associated with the respective one of the plurality of application processes are erased from a cache controller while preserving cache region addresses in the second type memory associated with the respective one of the plurality of application processes, and wherein, upon the respective one of the plurality of application processes becoming active again after becoming inactive, the cache region addresses in the first type of memory are reloaded and stored in the cache controller; and
- program instructions to dynamically change a size of the one of the private regions in the first type memory for the respective one of the plurality of application processes depending on one or more performance requirements for the respective one of the plurality of application processes.

16. The computer program product of claim 15, further including program instructions to define a first set of address ranges stored in a range of registers in the cache controller to serve as a private region of the first type memory for each one of the plurality of application processes.

17. The computer program product of claim 15, further including program instructions to define a second set of address ranges stored in a range of registers in the cache controller to serve as secondary private region of the second type memory for each one of the plurality of application processes.

18. The computer program product of claim 15, further including program instructions to:
- provide access to the private regions of the first type memory for each one of the plurality of application processes, wherein the private regions are configured as the cache of the second type memory;
- provide access to secondary private regions in the second type memory for each one of the plurality of application processes, wherein the secondary private regions are an additional cache in the second type memory for each one of the plurality of application processes; and
- coordinate access to the private regions of the first type memory and the secondary private region in the second type memory for each one of the plurality of application processes by the cache controller.

19. The computer program product of claim 15, further including program instructions to adjust a size of the private regions of the first type memory based on performance of for each one of the plurality of application processes using the private regions, wherein the size is increased or decreased.

20. The computer program product of claim 15, further including program instructions to:
- identify one or more of the plurality of application processes are active, wherein the one or more of the plurality of application processes use the first type memory and the second type memory; and
- load and store a first set of address ranges of the range stored in the cache controller to serve as a private region of the first type memory for an application process, wherein alternative address ranges of alternative ranges for each inactive application process is removed from the cache controller.

* * * * *